Feb. 28, 1967  F. S. ALLINQUANT  3,306,599
DAMPING DEVICE APPLICABLE ESPECIALLY TO SUSPENSIONS
HAVING AUTOMATIC HEIGHT CORRECTION
Filed Nov. 16, 1964  2 Sheets-Sheet 1
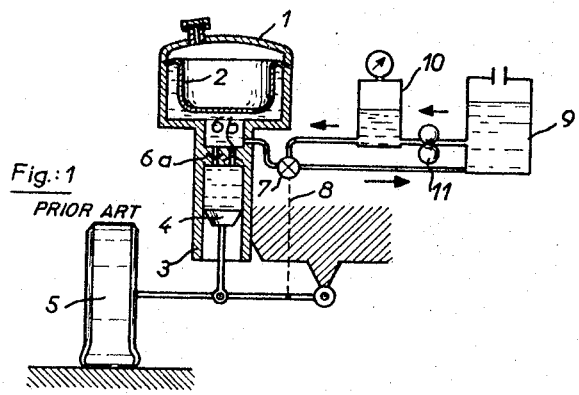
Fig.: 1
PRIOR ART
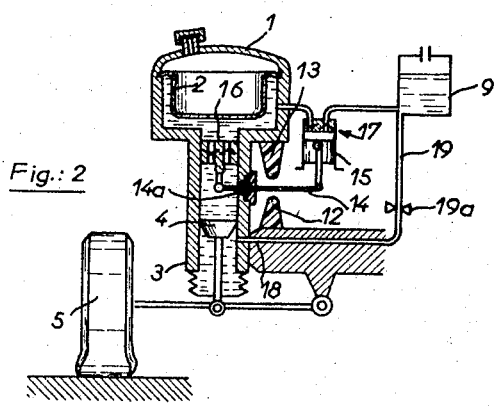
Fig.: 2
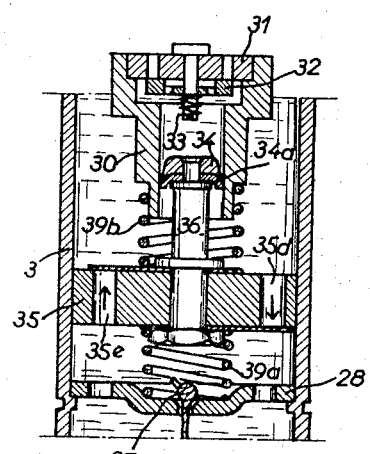
Fig.: 4
Inventor
Fernand Stanislas Allinquant
By Stevens, Davis, Miller & Mosher
Attorneys

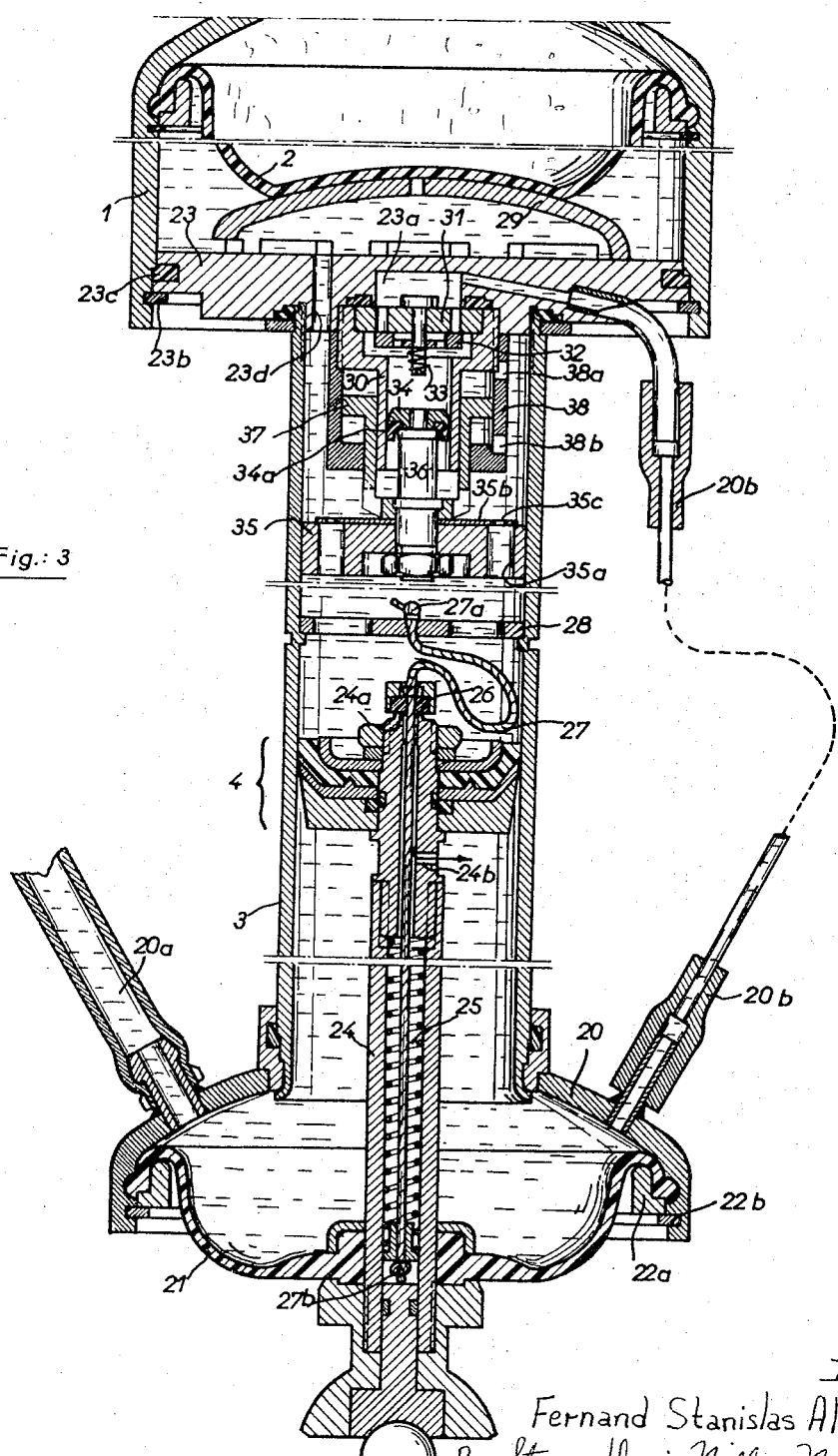
Fig.: 3

United States Patent Office 3,306,599
Patented Feb. 28, 1967

3,306,599
DAMPING DEVICE APPLICABLE ESPECIALLY TO SUSPENSIONS HAVING AUTOMATIC HEIGHT CORRECTION
Fernand Stanislas Allinquant, 53 Ave. le Notre, Sceaux, France
Filed Nov. 16, 1964, Ser. No. 411,281
Claims priority, application France, Nov. 19, 1963, 954,327
4 Claims. (Cl. 267—64)

The invention relates to an improved damping device applicable especially to suspensions having automatic height correction.

Proposals have already been made for utilizing the irregular movements of the suspension of a vehicle, which occur when the vehicle is in motion over ground that is never completely level, in order to actuate a pump and to place in reserve, fluid under pressure. Said fluid may be used to advantage in the suspension itself, when said suspension includes a device to correct height automatically.

A pump connected mechanically and directly to two parts of a vehicle that are respectively suspended and non-suspended presents, however, considerable difficulties in construction by reason of the very nature of the relative movement of these parts, which is sometimes very sharp and is, in any case, whatever is imposed by the suspension. Besides, the pumping effort is then added to that of the dampers so that the characteristics of the suspension are altered as regards the adhesion of the vehicle to the ground and the comfort of the passengers.

The present invention has as one object thereof, to provide a suspension comprising a pump the piston of which is linked to a damping piston adapted to be displaced in relation to the suspended and non-suspended parts of the suspension, this arrangement considerably reducing the difficulties set out above. This damping piston will be referred to hereinafter as "floating." It will be understood that the damping piston and the pump piston may, if desired, be of the kind with an oscillating plate.

The connection between the pump piston and the floating damping piston, which may be of any known type comprising passages traversed by fluid in two opposite directions and provided, if so required, with valves, is advantageously direct and achieved by mounting these pistons coaxially on a common shaft. It may, however, be preferred to interpose a lever between said pistons, so as to give them unequal strokes.

The pump actuated by the damping piston is preferably a single action pump for liquids, so arranged that its maximum resisting effort corresponds to the return of a wheel towards the lower position and to the intake of suspension fluid from a reserve into any given suspension element. Naturally, other arrangements are possible, with modifications such as will be indicated hereinafter.

The damping piston and the pump piston constitute a floating assembly, the displacements of which are limited by stops acting progressively. These stops may be constituted by a piston forming a dash-pot, in co-operation with a fixed cylinder provided, at least in the vicinity of its two ends, with bleed orifices of suitable section spaced apart at a suitable distance. As a modification, the floating assembly may be arranged between two opposed springs or similar means constituting resilient stops.

A suspension element possessing the abovementioned characteristics normally has a tendency to fill with liquid, drawn from the reserve, as soon as the vehicle moves across somewhat uneven ground, so bringing the suspended part of the vehicle to a raised position. To the element there is affixed by simple means an outlet valve, preferably internal, which operates when the height of said vehicle above the ground, and consequently the mean relative position of the suspended and non-suspended masses, passes a set value. This outlet valve is constituted by, for example, a valve the seat of which is rigid with a wheel and which is carried by a flexible connecting element, such as a thread of polyamide, which is attached at one end to the suspension element and is tensioned at the other end by a spring having a lengthy travel. Said valve is normally closed but it opens every time the gap between any particular wheel and the vehicle body exceeds a certain value.

In the opposite direction, i.e. if said gap is momentarily too narrow, showing that there is a lack of liquid in the suspension, every jolt effects the introduction by the pump into a given suspension element, of a small quantity of liquid and in a progressive return to the state of equilibrium. It will be apparent that the suspension will advantageously comprise, in addition, resilient stops to limit the stroke and a maintaining device for the membrane containing the reserve of gas under pressure, so as to permit the vehicle when out of use, to come to rest on said resilient stops as a result of internal leaks of liquid that are difficult to exclude in practice but that are, however, of minor importance since the oleopneumatic suspension remains capable of bearing a portion of the weight of the vehicle when the latter is being loaded, while jolts occurring when moving effect a rapid increase in the said weight-portion.

The following description with reference to the accompanying drawings, which is given by way of non-limitative example, will enable the various features of the invention and the manner in which they are to be carried into effect to be understood.

FIGURE 1 is a diagram of a conventional oleopneumatic suspension with automatic height correction;

FIGURE 2 is a corresponding diagram of an improved suspension according to the invention;

FIGURE 3 shows in diametral section, one particularly advantageous practical embodiment of this suspension, and FIGURE 4 is an analogous view, but only fragmentary, of one modification thereof, embodying a floating assembly formed by damping and pump pistons.

Referring to FIGURE 1, there is shown therein, a conventional oleopneumatic suspension element, with automatic trim correction, as associated with one wheel of a vehicle and shown very schematically. This suspension element comprises a reservoir 1 which contains a given quantity of compressed gas behind a membrane 2; there is also a suspension cylinder 3 which is rigid with reservoir 1 and contains liquid, a piston 4 connected to the wheel 5 being movable therein. The cylinder 3 has a partition 6 forming a damping means, being provided for this purpose with calibrated passages and opposed valves 6a, 6b, the valves being indicated purely diagrammatically by single arrow-heads.

The automatic height regulation which is advantageously obtained by adjusting the mass of liquid contained in an element of the suspension may be carried into effect, as indicated schematically, by means of a valve 7 having three ducts connected to the wheels by a resilient time-delay device 8. The valve 7 connects the cylinder alternatively with a tank 9 or with an accumulator 10 holding pressurized liquid brought from the tank by a pump 11.

In this embodiment all the damping energy is dissipated as heat. The pump 11 may be constructed as a piston pump actuated by the irregular vertical movements of the wheel 5 without, however, changing this characteristic or simplifying the device.

In the improved suspension shown in FIGURE 2, damping is effected by a piston 16 which is capable of moving within the cylinder 3 and which is linked to the piston 15 of a pump by, for example, a lever 14 which is pivotally mounted by means of a resilient block 14a and is able to move between two extreme positions determined by stops 12, 13 having a progressive action. These stops also may be blocks of resilient material of a specially designed shape.

The piston 15 slides within a pump body 17 which is provided with inlet and outlet valves indicated by arrows and is connected on the one hand to the tank 9 in which the suspension liquid is accumulated at ambient pressure and on the other hand to the reservoir 1 of the suspension element. It will immediately be observed that the irregular movements of the wheel 5 over uneven ground bring about a transfer of liquid from the tank 9 into the system constituted by the elements 1 and 3, the vehicle consequently tending always to take up a high position.

This tendency is counter-balanced by an outlet valve which allows suspension liquid to escape towards the tank when the clearance above the ground of the suspension element in question exceeds a certain set value. In FIGURE 2 this valve is constituted by the piston 4 itself, which uncovers a port 18 connected by a pipe 19 to the tank 9.

It will be noted immediately that the continuous operation of the suspension hereinbefore described makes it possible to avoid the use of any special time-delay device, a calibrated orifice 19a located in the tank return pipe 19 being adequate to ensure that an isolated but severe jolt does not cause excessive sinking of the suspension element. Thus the invention makes it possible to obtain the energy used in pumping from the damping energy which would otherwise be lost and the construction of the outlet device may be very simple; height correction is, for example, continuous and is effected within a wide range, as the need arises.

FIGURES 3 and 4 relate to a more refined embodiment comprising in particular a damping piston fast with the pumping piston and coaxial with it.

The cylinder 3 is secured at its base on a cup 20 which is formed by a membrane 21 gripped at its periphery by an intermediate member 22a held in place by a resilient ring 22b; at its upper end the cylinder 3 is screwed into a thick plate 23.

The cup 20 is connected to the tank 9 (not shown) by a conduit 20a and to the chamber 23a within the plate 23 by a second conduit 20b, this assembly being filled with oil at the prevailing pressure.

In the cylinder 3 there may slide a piston 4 connected by a rod 24 to a wheel of the vehicle, to which said piston transfers a portion of the vehicle's weight. The rod 24 traverses the membrane 21 by way of a suitable sealing portion and at its base it has a pivotal connection, which may be a ball-and-socket joint; the piston 4 mounted at the upper end of the rod 24 may be an oscillating piston of known type. It is advantageous for the rod to be hollow and provided at its upper end with a seating 24a of small diameter against which a valve member 26 is urged by a long internal spring 25, preferably of resilient material; it is likewise provided with an outlet orifice 24b. The outlet valve 26 is guided by a flexible thread 27 made of polyamide for example, with which it is integral and which is fixed at one end 27a to a cross-piece 28 which forms a detecting stop for the suspension element, the other end 27b of this thread being kept under tension by the spring 25.

The plate 23 is secured in fluid-tight engagement at its periphery (by means of, for example, a resilient ring 23b and a sealing washer 23c which is subjected to a shearing effect) with the reservoir-body 1 for the pressurized gas which provides the suspension with its resilience, this gas being contained by a membrane 2 which may be attached to the reservoir-body 1 just as the membrane 21 is attached to the cup 20. This plate has multiple passages 23d therein which provide communication between the reservoir 1 and the cylinder 3; a cover 29 is interposed to support the membrane 2 when the reservoir 1 is empty and to ensure that it does not mask the passages 23d. On the lower face of said plate the pump-damper assembly is screwed.

This assembly may be constructed in various ways in practice, two examples being shown in FIGURES 3 and 4 respectively. In these two instances the assembly consists of a cylinder 30 screwed to the base 23 with the interposition of a seal, this cylinder holding in place a valve-bearing unit 31 which closes the chamber 23a. The inlet valve 32 may be of any known type which is characterized by a relatively minor loss of fluid, which implies a considerable passage cross-section and a restoring spring 33 with a small loading.

The pump piston 34 sliding in the cylinder 30 includes a delivery valve which is preferably provided with a sealing washer having a flexible lip 34a directed in the direction away from the valve 32. A piston of this kind can operate correctly even when the axes of the cylinders 3 and 30 are imperfectly aligned.

The damping piston 36 is connected to the pump piston 34 by a rod 36 which also acts to secure its constituent elements together; the piston 35 is preferably of a kind which requires a greater effort for it to move downwardly than upwardly. By way of example, FIGURE 3 shows a piston 35 provided with passages 35a which are uncovered by an upper piece of foil 35b on the upward stroke, this foil being itself provided with orifices 35c, the cross-section of which is less than that of the passages 35a and which are effective only on the downward stroke.

On the rod 36 is mounted an annular piston 37 which constitutes, together with a fixed cylinder 38 screwed on to the cylinder 30, a dash-pot with double progressive action. For this purpose the cylinder 38 is provided with drilled apertures 38a and 38b located at positions corresponding to the ends of the stroke of the piston 37, which the piston obturates progressively. The cross-section and the spacing apart of these apertures may naturally be adjusted to suit the effect desired.

FIGURE 4 shows a modification in the construction of the floating assembly, with particular reference to its progressive stops. The damping piston 35 shown diagrammatically in this figure has two sets of passages 35d, 35e provided respectively with foil valves that lift in opposite directions. This piston is ararnged between two springs 39a, 39b supported on shoulders of the crosspiece 28 and of the cylinder 30 respectively.

The operation of the two constructions described above is similar to that of the device shown in FIGURE 2. In both constructions the partition 6 of FIGURE 1, which forms the damping means and is rigid with the cylinder 3, is replaced by movable partition constituted by the piston 35, which is connected to the cylinder 3 through the intermediary of the pump piston 34. The floating damping piston 35 consequently has a stroke during which the damping force exerts a pumping effect, said stroke being of necessity limited by stops that may with advantage be progressive.

It will be noted that the work of the pump is mainly performed when the vehicle wheel and the pistons 4, 34 and 35 go down and that it corresponds to the intake of oil into the cylinder 30 by means of the inlet valve 32. When the wheel and the piston 4 cease to be displaced, pressures are equalized throughout the suspension, that is to say, in the reservoir 1, in the cylinder 3 on one side and the other of the piston 35, and in the cylinder 30. The rise of the wheel is translated into the discharge of oil which was previously in the cylinder 30, the intake of a fresh amount of oil being thus prepared for.

It will be readily understood that, when the amplitude of the irregular movements of the wheel becomes substantial, the actuation of the grogressive stops which limit the stroke of the floating assembly 34, 35 results in the damping means operating in the conventional manner.

The outlet valve (24a, 24b, 25, 26, 27) acts in the same manner as the port 18 in FIGURE 2.

It will be understood that the present invention is not limited to the embodiments herein particularly described but that it covers also modifications that may be obtained, within the scope of the appended claims, by employing equivalent technical means. In particular, the piston 15 may be double-acting and carried by a flexible lever. The adjustment of the damping and pump valves, and also their location, may even bring about a compression effort greater than the expansion effort. It will be understood that the active fluid upon which the pump operates may be a gas and not a liquid and that the suspension element described above, which is an independent suspension element, may be used to attach any desired movable units on to a chassis.

What I claim is:

1. In combination with a main cylinder filled with a liquid and a first piston slidably mounted within said cylinder, an improved damping device comprising a second piston also slidably mounted within said cylinder, valve means in said second piston, a pump piston linked to and actuated by said second piston, a pump cylinder solid with said main cylinder and cooperating with said pump piston, and means cooperating with said second piston and pump piston assembly for progressively limiting the stroke thereof.

2. A damping device according to claim 1, wherein said second piston and pump piston are coaxially mounted on a connecting rod.

3. A damping device according to claim 2 wherein said pump piston comprises a sealing joint of the cup-type having a flexible lip which is turned over in direction of said connecting rod thereby to function as an outlet automatic valve.

4. In combination with an oleopneumatic suspension element comprising a suspension cylinder filled with a liquid, a suspension piston slidably mounted within said cylinder and a pressurized gas setting said liquid under pressure over said piston, a device comprising a damper piston also slidably mounted within said suspension cylinder, valve means in said damper piston, a pump piston linked to said suspension piston, a pump cylinder fixed to said suspension cylinder and cooperating with said suspension piston, said pump cylinder being equipped with an inlet automatic valve and with piping means connecting said valve to a liquid reservoir, said pump piston being equipped with an outlet valve allowing liquid pumped from said reservoir to flow into said suspension element, and liquid volume limiting means responsive to the relative location of said suspension piston and cylinder for allowing liquid in excess into said suspension element to flow back to said reservoir, said liquid volume limiting means comprising a port in the suspension cylinder which, when unmasked by the suspension piston, allows liquid to flow back into said reservoir, an axial bore through said suspension piston, a spring biased valve mounted at the end of said bore facing said damper piston for normally closing said bore and a supple tie having one end fixed to said suspension cylinder and the other end fixed to said spring biased valve.

References Cited by the Examiner
UNITED STATES PATENTS

| 2,937,034 | 5/1960 | Langen | 267—64 X |
| 2,982,538 | 5/1961 | Bourcier de Carbon | 267—64 |
| 3,007,694 | 11/1961 | Bingamen | 267—64 |

ARTHUR L. LA POINT, *Primary Examiner.*

R. M. WOHLFARTH, *Assistant Examiner.*